United States Patent [19]

Chou et al.

[11] Patent Number: 5,623,571
[45] Date of Patent: Apr. 22, 1997

[54] POLARIZATION COMPENSATED WAVEGUIDE GRATING ROUTER

[75] Inventors: Patrick C. Chou, Cambridge, Mass.; Charles H. Joyner; Martin Zirngibl, both of Middletown, N.J.

[73] Assignee: Lucent Technologies Inc., Murray Hill, N.J.

[21] Appl. No.: 521,099

[22] Filed: Aug. 29, 1995

[51] Int. Cl.$^6$ .................................................. G02B 6/126
[52] U.S. Cl. .............................. 385/130; 385/11; 385/14; 385/27
[58] Field of Search ............................... 385/11, 14, 15, 385/24, 27, 37, 39, 129–132

[56] References Cited

U.S. PATENT DOCUMENTS

| | | | |
|---|---|---|---|
| 5,136,671 | 8/1992 | Dragone | 385/37 X |
| 5,339,157 | 8/1994 | Glance et al. | 385/24 |
| 5,341,444 | 8/1994 | Henry et al. | 385/11 |
| 5,488,680 | 1/1996 | Dragone | 385/24 |
| 5,506,925 | 4/1996 | Greene et al. | 385/129 |
| 5,515,460 | 5/1996 | Stone | 385/24 |

OTHER PUBLICATIONS

B. H. Verbeek et al., "Large Bandwidth Polarisation Independent and Compact 8 Channel PHASAR Demultiplexer/Filter," *OFC* '94, Feb. 1994, paper PD 13–1. Cited in application; technological background of the invention.

M. Zirngibl et al., "Polarisation Endependent 8×8 Waveguide Grating Multiplexer On InP," Electronics Letters, 21 Jan. 1993, vol. 29, No. 2, pp. 201–202. Cited in application; technological background of the invention.

*Primary Examiner*—John D. Lee

[57] ABSTRACT

A polarization compensated waveguide grating router is formed by reducing the thickness of the cladding material deposited over segments of waveguide cores to be on the order of the height of the vertical extension of the optical field of the waveguide. The resulting "air-patch" segments increase the birefringence in the patch segments of the waveguides. By using an air-patch length which is inversely proportional to the length of each waveguide, the correct phase relationship can be maintained between the different waveguides to produce an InP-based router which is polarization independent.

13 Claims, 5 Drawing Sheets

POLARIZATION COMPENSATED WAVEGUIDE GRATING ROUTER

TECHNICAL FIELD

The invention relates to polarization compensated integrated optical devices and, more particularly, to a polarization compensated waveguide grating router.

BACKGROUND OF THE INVENTION

There have been several attempts to make the waveguide grating router (WGR) on InP polarization insensitive. An InP-based router is desired so that it may be implemented along with photodetectors, optical amplifiers, modulators, switches and any other active optoelectronic components on a common InP substrate. The polarization sensitivity is caused by the birefringence of the InP-based waveguides and is a serious problem if the router is used in a receiver or as a passive demultiplexer. This problem can be solved by simply matching the free spectral range (FSR) and electrical field (TE) and magnetic field (TM) shift of the router, but by doing so, one severely restricts the optical bandwidth over which the router can operate. Such an arrangement is described in the article by M. Zirngibl et al. entitled "Polarisation independent 8×8 waveguide grating multiplexer on InP," *Electronic Letters*, Vol. 29, 1993, pages 201–202. Another approach is to make the InP waveguides non-birefringent, as described in the article by B. H. Verbeek et al. entitled "Large Bandwidth Polarisation Independent and Compact 8 Channel PHASAR Demultiplexer/Filter," *OFC '94*, February 1994, paper PD 13-1. These waveguides, however, do not seem practical for integration with optical amplifiers, for instance. Another technique, described in U.S. Pat. No. 5,341,444 issued to C. H. Henry et al. on Aug. 23, 1994 and entitled "Polarization Compensated Integrated Optical Filters and Multiplexers," has been successfully employed for $SiO_2$-based circuits but is not suited for InP-based devices. Thus it is a continuing problem to implement an InP-based router which is polarization independent.

SUMMARY OF THE INVENTION

We have recognized that by reducing the thickness of the cladding material deposited over a segment of a waveguide core to be on the order of the height of the vertical extension of the optical field of the waveguide, we can effectively produce an "air-patch" segment which can be used to change birefringence (e.g., increasing the transmission speed of the TE wave relative to the TM wave in the patch segment of the waveguide). By using an air-patch length which is inversely proportional to the length of the waveguide, the correct phase relationship can be maintained between different waveguides to produce an InP-based router which is polarization independent.

In one embodiment, an optical waveguide device of the type comprising a substrate wafer (hereinafter wafer), a cladding layer disposed on the wafer, an elongated cross-section waveguide core, embedded within the cladding layer and having a refractive index higher than the indices of surrounding cladding material, for transmitting light along a length of the waveguide core, the waveguide device characterized by the capacity to transmit light in the two states of polarization which exhibit different effective indices of refraction. Our improvement comprises a first segment along the length of the waveguide core having a thickness of cladding located over the core which is substantially less than the thickness of the cladding located over the core of a second segment along the length of the waveguide core.

In another embodiment, an integrated optic waveguide multiplexer/demultiplexer device comprises a pair of couplers and an array of waveguides between the couplers, each successive waveguide of the array of waveguides exhibiting a predetermined progression of length, our improvement comprising including, in at least one waveguide, a first segment along the length of that waveguide having a cladding located over the waveguide with a thickness which is substantially less than the thickness of the cladding located over the waveguide in a second segment of that waveguide so as to provide that waveguide with a polarization-independent response.

DETAILED DESCRIPTION

In the following description, each item or block of each figure has a reference designation associated therewith, the first number of which refers to the figure in which that item is first located (e.g., 102 is located in FIG. 1).

Figure 1:
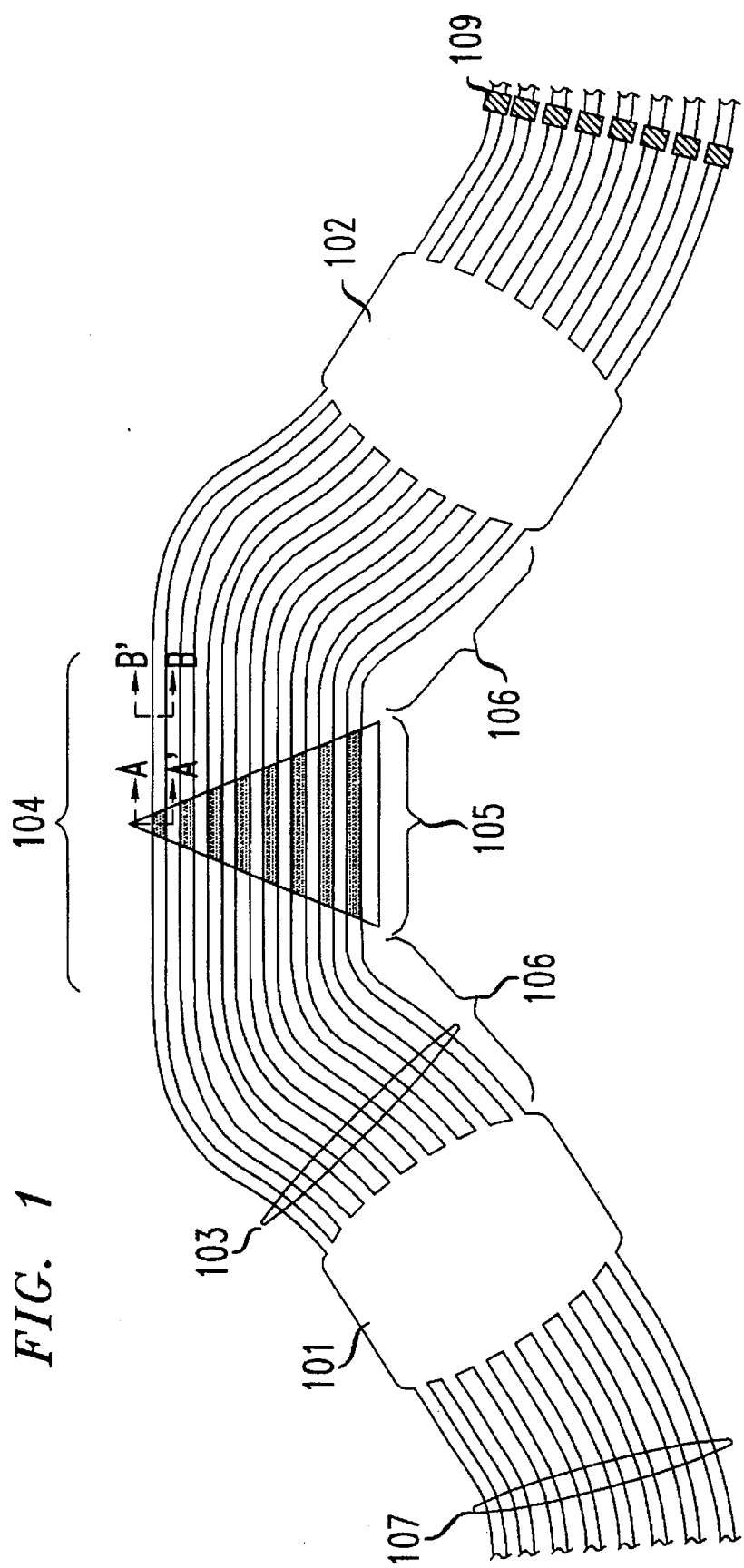
FIG. 1 shows an illustrative integrated optical waveguide filter (router) in which the present invention may be implemented.

To understand how polarization sensitivity arises in routers, we refer now to FIG. 1. In the waveguide grating of FIG. 1, light signals are received in waveguides 107 and travel from tree space region 101 to free space region 102 through multiple grating arms (or waveguides) 103 whose length differences between neighboring arms is a constant ΔL. This length difference translates into a phase difference $\Delta\Phi = 2\pi\Delta LN/\lambda$ where N is the material index and λ the signal wavelength. It is this phase difference that determines which output port the far field pattern in the second free space region will focus on. If there is an index difference between TM and TE modes, $\Delta N = N_{TM} - N_{TE}$, the routing properties depend not only on the signal wavelength λ but also on its state of polarization, leading to this undesirable polarization sensitivity.

First, let us consider two arms, the first one being ΔL shorter than the second. The idea is to add to both arms an additional length of waveguide. The geometrical length of this extension is the same, Δl, for both arms, but the added waveguides have different birefringences. For our example here, the longer arm's waveguide extension continues to have the same index N but the shorter arm changes to an index of n and to a birefringence of $\Delta n = n_{TM} - n_{TE}$. If a coherent wave travels through both arms, the phase difference at the output of the arms becomes $$\Delta\Phi = 2\pi(\Delta LN + \Delta l(N-n))/\lambda \quad (1)$$

It is easy to show that if $\Delta\Phi$ is to become independent of polarization, the two path length differences must be related by $$\Delta l = \Delta L/(\Delta n/\Delta N - 1) \quad (2)$$

The consequence for the router becomes clear now. We basically have to deal with two gratings, the first one being created by real path length differences and the second one determined by the index path length differences. The idea works best if $\Delta n/\Delta N$ is much larger than unity because the path length difference, $\Delta l$, needed to achieve the compensation is then small compared to $\Delta L$. Of course, the trick would work, in principle, for any value of $\Delta n/\Delta N$ even if it were negative.

A compensated router device is depicted in FIG. 1. Illustratively, the waveguides include a straight section 104 formed in the middle of the router where the triangular shaped patch 105 is located. The patch 105 could, in principle, be applied directly over the curved section and, therefore, not add to the total device length but we prefer the design in FIG. 1 because bend losses are very sensitive to changes in the refractive index.

The previously referenced Henry patent also described a patch technique for reducing birefringence in silica waveguides on silicon substrates by using a high index patch in which birefringence is reduced below that of the non-patch segment of the waveguide by slowing the transmission speed of the electrical field (TE). In Henry, as shown in our FIG. 2, a silicon nitride patch 9 is buried in the $SiO_2$ cladding 23 and has an index (1.9) which is higher than the index (1.5) of the doped silica core 20. Unfortunately, Henry's high index buried patch technique, which works well in $SiO_2$ based circuits 22, is not suited for InP-based devices.

Figure 3:
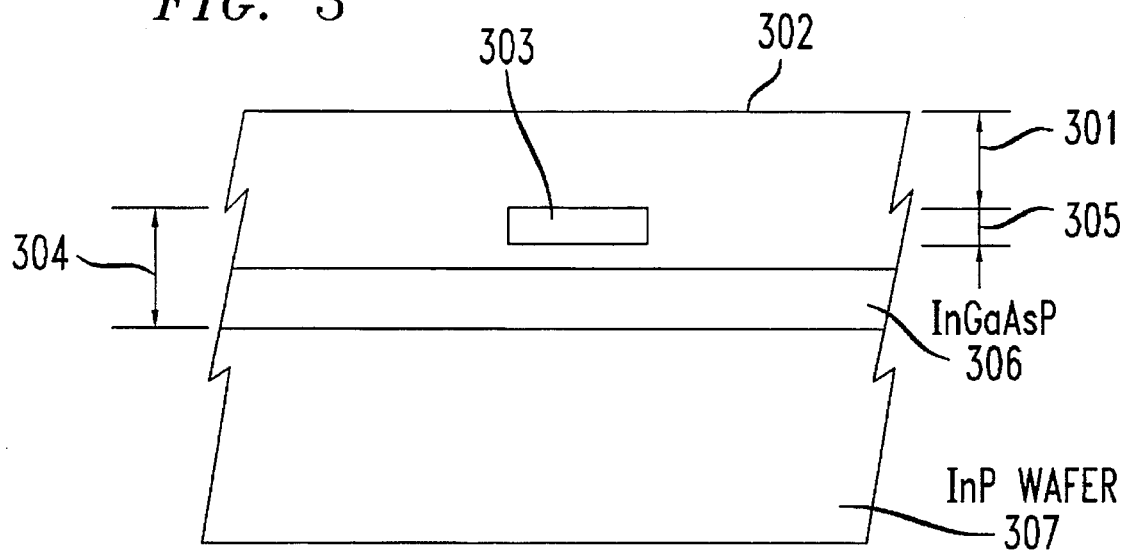
FIG. 3 shows a cross-section of a first A-A' section of a waveguide implementation of FIG. 1.

With reference to FIGS. 1 and 3, we have recognized that by reducing the thickness of the cladding material 301 deposited over a segment of the waveguide core 303 to be on the order of the height of the vertical extension of the electrical field (TE) of the waveguide, we can effectively produce an "air-patch" segment which can be used to increase the birefringence in the patch segment of the waveguide. The thickness dimension of the cladding 301 of the air-patch segment is of the same order ($\approx 2000$Å) as the combined thickness 304 of the waveguide core 303, cladding below the core (the etch stop layer) 305 and the guiding layer 306. Using our novel air-patch concept (where air has an index of one), we have created an InP-based router which is polarization independent.

The prior art Henry patch (FIG. 2) teaches that the longer waveguides need longer embedded patches to enable the light in the corresponding waveguides to reach the coupler with the correct phase relationship. In comparison, in the present invention, the birefringence is increased in the air-patch segment. As will be later discussed in more detail, in our router the longer waveguides of 103 have the shorter air-patch segments 105.

Figure 4:
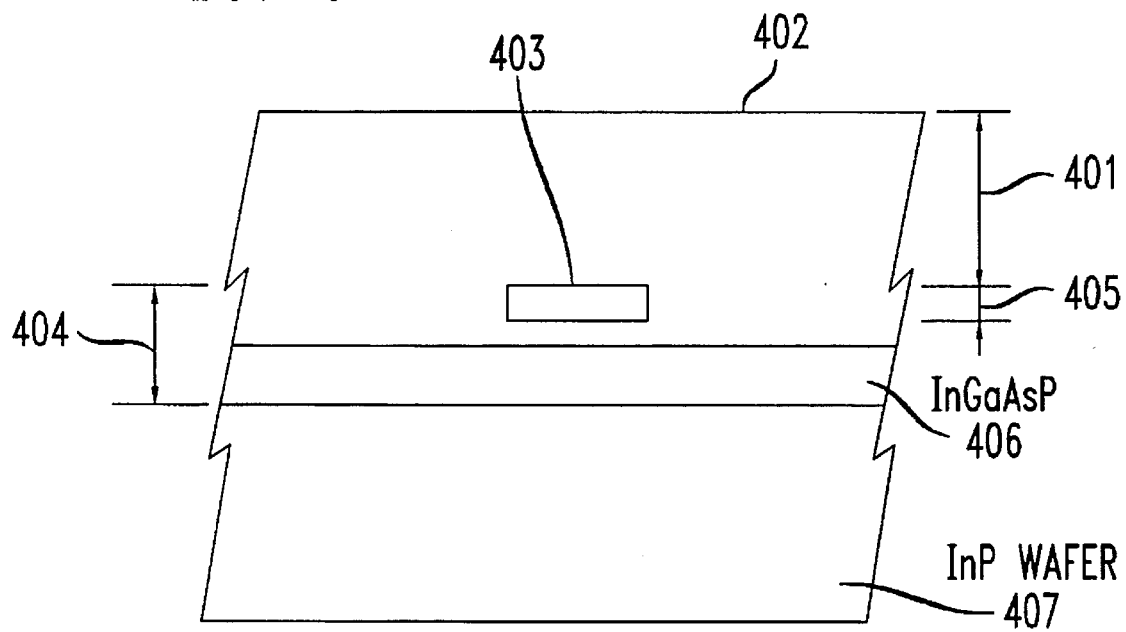
FIG. 4 shows a B-B' cross-section of FIG. 1.

With reference to FIGS. 3 and 4, we use a buried floating rib structure waveguide for the router of FIG. 1. As shown in FIG. 4, in the segment of the waveguide 106 outside the patch segment 105, the thickness 401 of the InP above the rib 403 is at least 1 µm so that light in the waveguide is completely decoupled from the semiconductor-air interface 402. The birefringence of this waveguide is 3.5 nm (we define the birefringence by $\lambda\Delta n/n$). With reference to FIG. 3, in the patch segment 105, the waveguide is buried by only 0.2 µm of InP 301. In this case, the guided wave is strongly affected by the presence of the air interface 302 which, in turn, increases the birefringence to 8.4 nm. By putting these numbers into equation (2), one finds that $\Delta l = 0.715 \Delta L$.

The illustrative router of FIG. 1 was designed for 8 channels spaced by 200 Ghz (1.6 nm). With joint reference to FIGS. 1, 3 and 4, the router of FIG. 1 is produced using the following well-known processing steps. First, a 2 to 3000Å guiding layer of InGaAsP, 406, is grown on an InP wafer, 407. Thereafter, the floating rib waveguide structure 304 is formed, illustratively including a 400Å InGaAsP rib 303 deposited on a 150Å InP layer 305 formed using conventional photolithography. In a first regrowth, the whole wafer is overgrown by 0.2 µm cladding 301 of InP. $SiO_2$ stripes are then deposited on surface 302 in the area of the triangular patch 104; these stripes prevent InP from growing there in a second regrowth which buries the segments 106 of waveguides by another 0.8 µm (hence the thickness 301 is 0.2 µm plus 0.8 µm). After completion of the second InP regrowth, the $SiO_2$ on surface 302 is removed from the patch segment 104 and the routers (FIG. 1) are cleaved out of the InP wafer. It would be possible to avoid the second InP regrowth by including a stop etch 0.2 µm above the rib (at surface 302) and etching down to it after the structure is buried by 1 µm InP.

Figure 2:
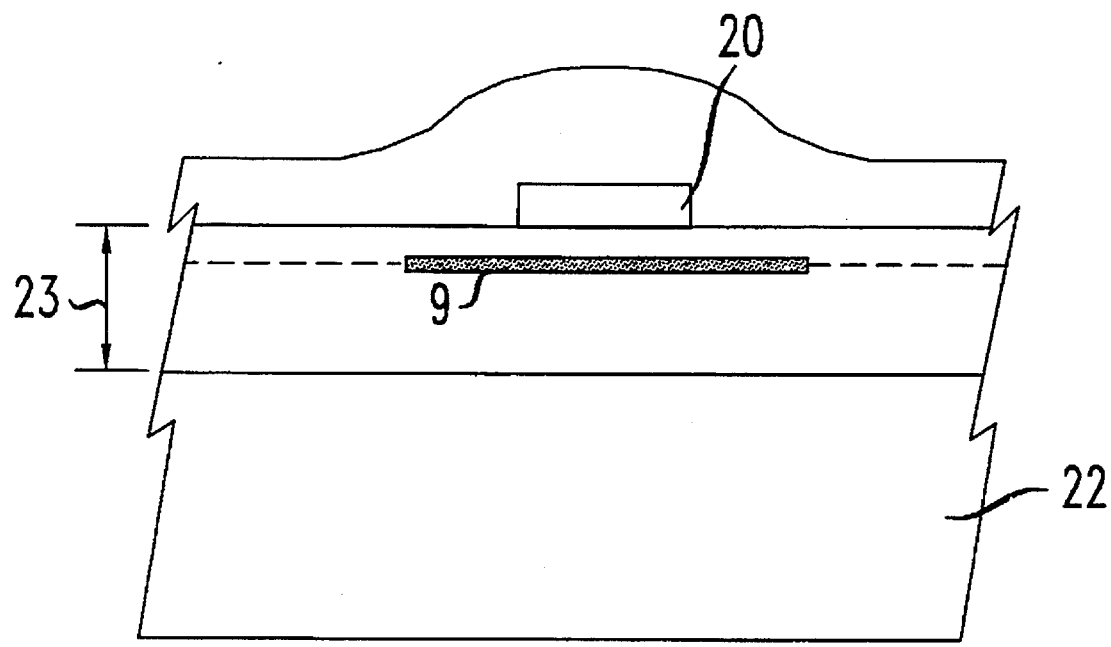
FIG. 2 shows FIG. 2 of the prior art U.S. Pat. No. 5,341,444.
Figure 5:
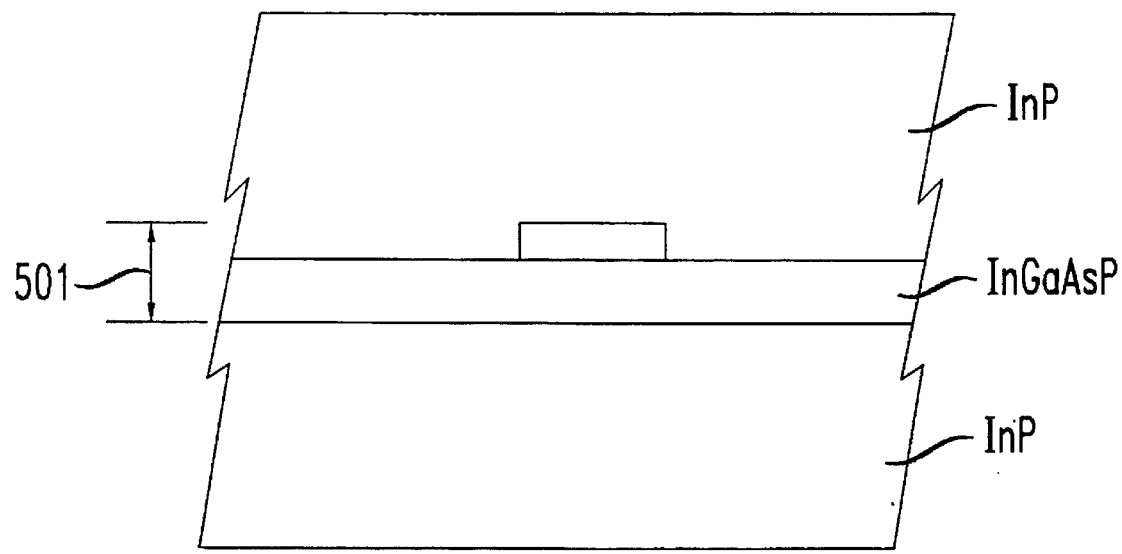
FIG. 5 shows a cross-section A-A' of a buried rib waveguide implementation of FIG. 1.
Figure 6:
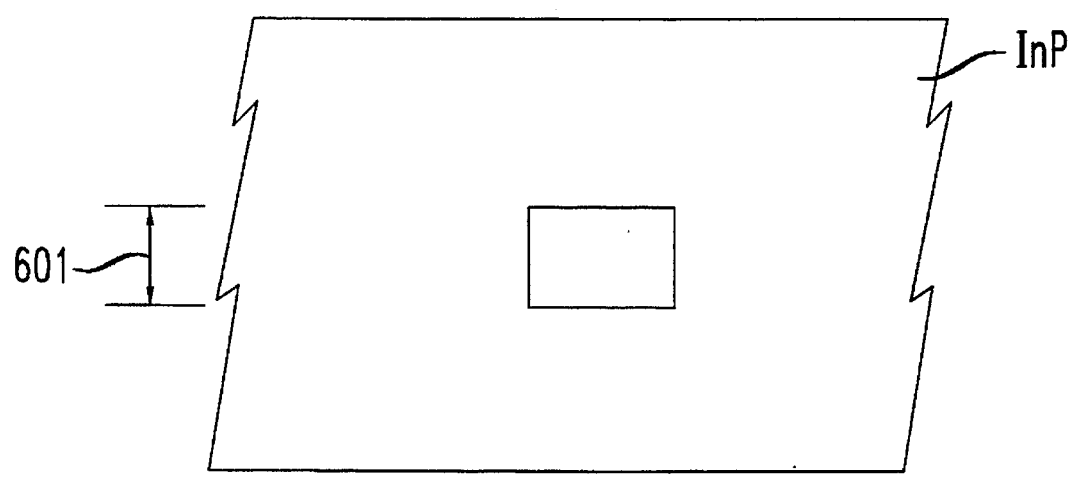
FIG. 6 shows a cross-section A-A' of an embedded core waveguide implementation of FIG. 1.

While the present invention has been described using the floating type of buried rib waveguide structure of FIG. 2, it should be noted that the present invention can be implemented using a buried rib waveguide structure shown in FIG. 5 or the embedded waveguide of FIG. 6. With regard to the thickness of buried rib waveguide 501 of FIG. 5 and 601 of FIG. 6, they are about equal to the thickness of 304 of FIG. 3. For convenience sake, hereinafter the waveguide structures of FIGS. 2, 5 and 6 are all referred to as an embedded core waveguide type structure.

The present invention also enables compatible InP optical circuits such as, illustratively, photodetectors, optical amplifiers, modulators, switches, phase rotators, wavelength changers, and other compatible active or inactive optoelectronic components (e.g., 109 of FIG. 1) to be monolithically integrated together with our router device. According to another embodiment of the present invention, the waveguides may be constructed using a titanium diffusion of lithium niobate, $LiNbO_3$, on a $LiNbO_3$ substrate (wafer).

Figure 7:
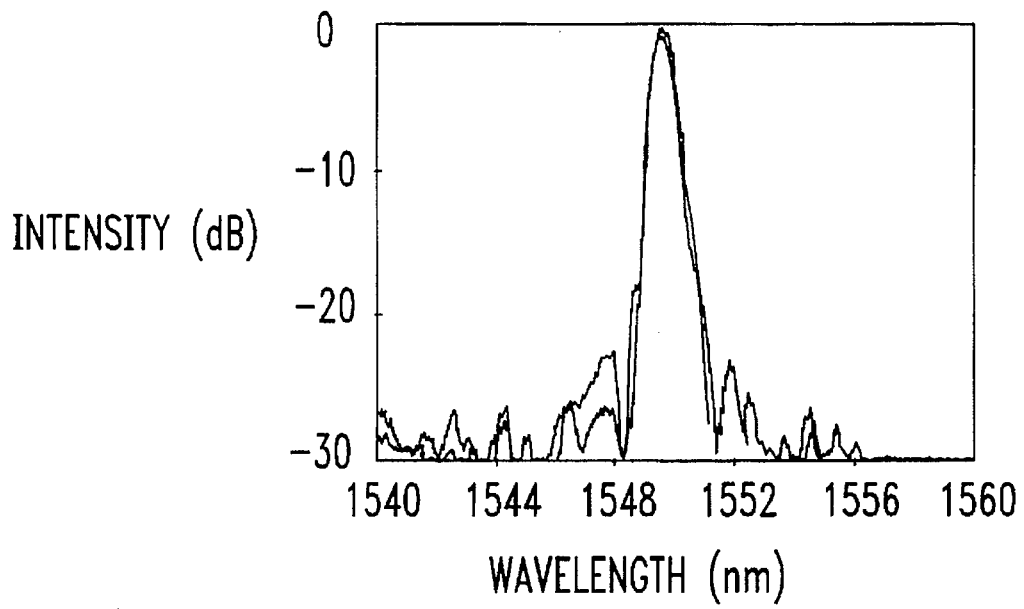
FIG. 7 shows the transmission spectra for TM and TE modes for the embodiment of FIG. 1.
Figure 8:
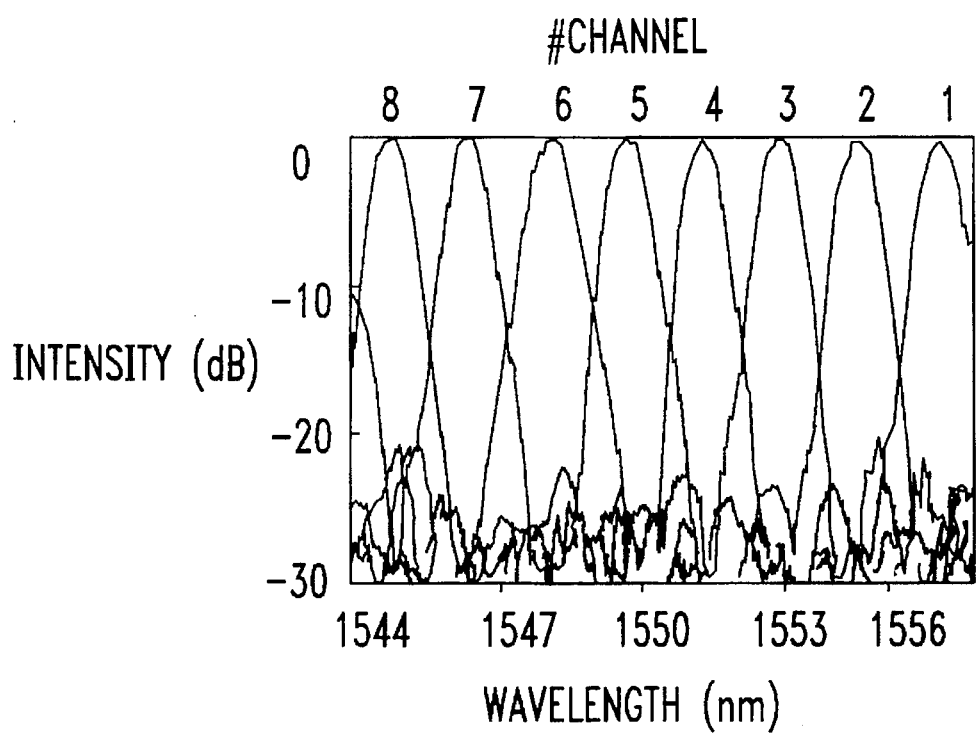
FIG. 8 shows the spectra for TM polarization for all 8 channels.

The device of FIG. 1 was tested by injecting light from a tunable laser through a lensed fiber into one of the input ports 105. The two transmission spectra for TM and TE modes were found to overlap almost completely, as shown in FIG. 7. The spectra for TM polarization for all 8 channels are plotted in FIG. 8. The spectra have been normalized with respect to their peak value for each channel. Insertion loss for the outermost channels (1 and 8) is typically 2 dB higher than for the central channels (4 and 5). Compared to a straight test waveguide, the central channels show an on-chip insertion loss of 3 dB. Including the 1–2 dB loss of the test waveguide brings the total insertion loss to about 5 dB. Insertion losses for TE and TM are the same within 1 dB. The spectral characteristics of the router look very good. The highest side lobe is at least −21 dB down from the peak value. The average spectral power density that is more than one channel spacing away from peak value is suppressed by −27 dB. Comparison to uncompensated routers reveal that there is no significant penalty in terms of insertion loss or crosstalk that arises from the compensation scheme.

What has been described is merely illustrative of the application of the principles of the present invention. Other arrangements and methods can be implemented by those skilled in the art without departing from the spirit and scope of the present invention.

We claim:

1. In an optical waveguide device of the type comprising a substrate wafer, a cladding layer and a guiding layer disposed on the wafer, an elongated cross-section waveguide core, embedded within the cladding layer and having a refractive index higher than the indices of surrounding cladding material, for transmitting light along a length of the core, said waveguide device characterized by the capacity to transmit light in a plurality of optical modes having different states of polarization and exhibiting different effective indices of refraction for said different states of polarization, the improvement comprising a first segment along the length of the core having a thickness of cladding located over the core which is substantially less than the thickness of the cladding located over the core of a second segment along the length of the core, the cladding over the first segment providing an increased birefringence of the first segment relative to the birefringence of the second segment.

2. The device of claim 1 wherein the core is implemented in a rib configuration.

3. The device of claim 2 wherein the rib is implemented in a floating rib configuration.

4. The device of claim 1 wherein the core and the guiding layer are InGaAsP and the cladding layer and wafer are InP.

5. The device of claim 4 wherein the thickness of the cladding over the first segment of the core is approximately 0.2 μm and the thickness of the cladding over the second segment is about 1 μm.

6. The device of claim 1 wherein the core is a titanium diffusion of $LiNbO_3$ and the cladding layer and wafer are $LiNbO_3$.

7. The device of claim 1 wherein the thickness over the first segment of the core is approximately equal to the thickness from the top of the core to the bottom of the guiding layer.

8. The device of claim 1 wherein the thickness of the cladding over the first segment of the core is approximately equal to the height of the vertical extension of the optical field above the core.

9. The device of claim 1 further including one or more optoelectronic devices optically coupled to the optical waveguide device to process light signals thereof, the one or more optoelectronic devices selected from a group including at least a detector, an amplifier, a modulator, a switch, a phase rotator and a wavelength changer, and which are monolithically integrated together with the optical waveguide device.

10. In an integrated optic waveguide multiplexer/demultiplexer device disposed on a wafer, and comprising a pair of couplers and an array of waveguides between said couplers, each successive waveguide of the array of waveguides exhibiting a predetermined progression of length, the improvement comprising including, in at least one waveguide, a first segment along the length of that waveguide having a cladding located over the waveguide with a thickness which is substantially less than the thickness of the cladding located over the waveguide in a second segment of that waveguide so as to provide that waveguide with a polarization-independent response, the cladding over the first segment providing an increased birefringence of the first segment relative to the birefringence of the second segment.

11. The waveguide device of claim 10 further including at least one optoelectronic device, optically coupled to and monolithically integrated together with the waveguide device, for processing light signals thereof, said optoelectronic device being selected from a group including at least a detector, an amplifier, a modulator, a switch, a phase rotator and a wavelength changer.

12. The waveguide device of claim 10 wherein the waveguide is a titanium diffusion of $LiNbO_3$ and the cladding and wafer are $LiNbO_3$.

13. The waveguide device of claim 10 including a plurality of waveguides each having a first segment, wherein the length of the first segment of each waveguide varies inversely with the length of that waveguide.

\* \* \* \* \*